(12) United States Patent
Raman et al.

(10) Patent No.: US 8,151,179 B1
(45) Date of Patent: Apr. 3, 2012

(54) METHOD AND SYSTEM FOR PROVIDING LINKED VIDEO AND SLIDES FROM A PRESENTATION

(75) Inventors: Tiruvilwamalai V. Raman, San Jose, CA (US); Charles L. Chen, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 881 days.

(21) Appl. No.: 12/126,136

(22) Filed: May 23, 2008

(51) Int. Cl.
*G06F 17/00* (2006.01)

(52) U.S. Cl. ........ 715/203; 715/201; 715/202; 715/204; 715/719; 715/720; 715/721; 715/722; 715/730

(58) Field of Classification Search .......... 715/201–204, 715/704, 716, 719–722, 730
See application file for complete search history.

(56) References Cited

U.S. PATENT DOCUMENTS

| | | | | |
|---|---|---|---|---|
| 5,600,775 | A * | 2/1997 | King et al. | 715/203 |
| 6,173,317 | B1 * | 1/2001 | Chaddha et al. | 709/219 |
| 6,532,218 | B1 * | 3/2003 | Shaffer et al. | 370/260 |
| 6,665,835 | B1 * | 12/2003 | Gutfreund et al. | 715/202 |
| 6,691,126 | B1 * | 2/2004 | Syeda-Mahmood | 707/696 |
| 6,697,569 | B1 * | 2/2004 | Gomez et al. | 386/201 |
| 6,728,753 | B1 * | 4/2004 | Parasnis et al. | 709/203 |
| 6,760,749 | B1 * | 7/2004 | Dunlap et al. | 709/204 |
| 6,912,726 | B1 * | 6/2005 | Chen et al. | 725/113 |
| 7,143,177 | B1 * | 11/2006 | Johnson et al. | 709/231 |
| 7,149,957 | B2 * | 12/2006 | Hull et al. | 715/200 |
| 7,149,973 | B2 * | 12/2006 | Dias et al. | 715/717 |
| 7,206,773 | B2 * | 4/2007 | Erol et al. | 1/1 |
| 7,266,568 | B1 * | 9/2007 | Erol et al. | 1/1 |
| 7,330,875 | B1 * | 2/2008 | Parasnis et al. | 709/204 |
| 7,559,017 | B2 * | 7/2009 | Datar et al. | 715/230 |
| 7,735,101 | B2 * | 6/2010 | Lanza et al. | 725/32 |
| 7,823,058 | B2 * | 10/2010 | Pea et al. | 715/230 |
| 2002/0161797 | A1 * | 10/2002 | Gallo et al. | 707/500.1 |
| 2003/0061280 | A1 * | 3/2003 | Bulson et al. | 709/203 |
| 2004/0205477 | A1 * | 10/2004 | Lin | 715/500.1 |
| 2004/0255337 | A1 * | 12/2004 | Doyle et al. | 725/135 |
| 2005/0160368 | A1 * | 7/2005 | Liu et al. | 715/762 |
| 2007/0003223 | A1 * | 1/2007 | Armstrong et al. | 386/95 |
| 2007/0260677 | A1 * | 11/2007 | DeMarco et al. | 709/203 |
| 2008/0229181 | A1 * | 9/2008 | Jung et al. | 715/203 |

OTHER PUBLICATIONS

Microsoft Computer Dictionary; May 1, 2002; Microsoft Press; Fifth Edition; pp. 399 and 611.*

* cited by examiner

*Primary Examiner* — Doug Hutton, Jr.
*Assistant Examiner* — Andrew Dyer
(74) *Attorney, Agent, or Firm* — Robert T. Neufeld; King & Spalding LLP (57) ABSTRACT

Systems and methods for linking slides used during a presentation with a video recording of the presentation are provided. A presenter can develop slides for a presentation using a presentation tool. The presenter can then use the presentation tool to present the slides during a live talk, a video of which can be simultaneously recorded. The presentation tool can record the times at which each slide in the presentation was displayed, and for how long each slide was displayed. After the presentation concludes, the video recording or a link thereto can be provided to the presentation tool, which then can link the video recording to the slides. Viewers of the linked presentation can view the video and slides of the presentation, with the slides advancing in step with the video. Additionally, advancing or rewinding the slides can advance or rewind the video to the corresponding time point, and vice-versa.

28 Claims, 7 Drawing Sheets

METHOD AND SYSTEM FOR PROVIDING LINKED VIDEO AND SLIDES FROM A PRESENTATION

TECHNICAL FIELD

The invention relates to providing presentation slides along with a video of a live presentation using those slides. More specifically, the invention relates to seamlessly linking a video of a presentation with slides used during the presentation, and providing the linked presentation to viewers.

BACKGROUND

Presenters of talks, speeches, and other presentations often use slides to provide a visual context or additional information for their presentations. Many presenters use computer software programs to develop and present these slides during a presentation. After giving the presentations, some presenters choose to make the presentation slides available for the general public—or a specific group—to view. With the increasing popularity of the Internet, many presenters offer their presentation slides for download by Internet users. However, those who view the slides without having been at the live presentation where they were presented may not fully understand the significance or context of the slides without the speech or talk given by the presenter.

To provide additional context for viewers interested in the presentation, some presenters have videos of their presentation recorded, and then make these video recordings available for download by Internet users or to other interested parties instead of the slides. However, the video recordings often focus on the presenter and not the slides, and thus the slides that provide additional detail or context may not be easily viewable in these videos.

To address this limitation, some presenters provide both the slides and a video recording associated with the presentation. However, even when both the slides and the video recording are provided to a viewer, the viewer may find it difficult to follow the video properly, and to know when to switch slides to keep pace with the video recording. Additionally, in such an arrangement, it also may be difficult for the viewer to navigate the presentation video or slides. For example, if the viewer wishes to skip several slides ahead, perhaps to skip a portion of the presentation in which the viewer is not interested, then the viewer must then try to find the portion of the video that corresponds to the slide being viewed. Conversely, if the viewer wishes to advance or rewind the video, then the viewer must then find the slide corresponding with the portion of the video being viewed. Finding the slide corresponding to a given time period in the video and finding the portion of the video corresponding with a slide can be time-consuming tasks, and may therefore decrease the utility of providing slides and videos of a presentation.

A need in the art therefore exists for a system that overcomes one or more of the above-described limitations.

SUMMARY OF THE INVENTION

In one embodiment of the invention, a method for creating an online product that includes synchronized data streams can include receiving a first data stream including video data that is captured in an identified time frame; receiving a second data stream including slide-presentation data in the identified time frame that is associated with the video data; generating a synchronized online product including the video data and slide presentation data, including generating a plurality of time-indexed links in each of the video data and the respective slide-presentation data, each link being at a particular time point in one of the data and activating the other data at a time point corresponding to the particular time point; and storing the synchronized online product in a data storage device for later retrieval and online delivery. The synchronized online product can be permitted to be accessed by viewers for online publication. Viewers that receive the synchronized online product can be permitted to identify a selection of either of the video and slide-presentation data at a particular point in the time during the video and slide-presentation, and the viewers can be permitted view the non-selected video or slide-presentation data at the particular point in time. The online product can be displayed on a user interface of the video and the slide-presentation data in a time-coordinated fashion.

In another embodiment of the invention, a method for creating a synchronized presentation for publication as an online product can include receiving continuous data captured in an identified time frame; receiving discrete data in the identified time frame associated with the continuous data; generating a synchronized presentation online product, including generating one or more time-indexed links in each of the continuous data and the respective discrete data, each link being at a particular time point in one of the data and activating the other data at a time point corresponding to the particular time point; and storing in a data storage device for later retrieval and online delivery of the synchronized presentation online product. The synchronized presentation online product can be permitted to be accessed by viewers for online publication. Viewers that receive the online publication can be permitted to identify a selection of either of the presentation data at a particular point in the time during the presentation. Viewers can be permitted view the non-selected continuous or discrete data at the particular time point, and the online publication can be displayed on a user interface of the continuous and the discrete data in a time-coordinated fashion.

In another embodiment of the invention, a system for creating synchronized video and accompanying slide-presentation for online publication can include one or more information processing units for executing programs; one or more network interfaces in communication with the one or more information processing units for receiving and transmitting video and presentation data; one or more data storage devices in communication with the one or more information processing units; and an engine executable on the one or more information processing units. The engine can include instructions for receiving video data captured in an identified time frame; instructions for receiving data representing a presentation in the identified time frame associated with the video data; instructions for generating a synchronized combined video and presentation online product, including generating one or more time-indexed links in each of the video data and the respective presentation data, each link being at a particular time point in one of the data and activating the other data at a time point corresponding to the particular time point; and instructions for storing in a data storage device for later retrieval and online delivery of the synchronized video and presentation online product; instructions for retrieving the combined video and presentation online product; and instructions for transmitting to a viewer upon request the combined video and presentation online product.

In another embodiment, a computer-readable program for use in conjunction with a system containing a presentation tool application and a video player application can include a first program code for extending the presentation tool application to create and store time-indexed hyperlink information in conjunction with presentation data; time-indexed metadata generated by the first program code; and a second program code for extending the video player that consumes time-indexed hyperlinks.

In another embodiment, a computer-readable program for use in conjunction with a computer system running a video player application and a presentation application can include a computer-readable storage medium and a retrievable computer-readable data. The computer-readable program can include computer-readable data representing a synchronized combined video and presentation online product. The computer-readable data can include first computer-readable data representing video content and containing one or more time-stamped hyperlinks, and second computer-readable data representing presentation content and containing one or more time-stamped hyperlinks. The time stamped hyperlinks in the first computer-readable data, when invoked, can link to a location in the second computer-readable data representing presentation content having a corresponding time stamp, and the computer-readable data, when processed by the computer system, can operate as components for use in connection with the video player application and the presentation application to display synchronized hyperlinked video content in conjunction with presentation content.

These and other aspects, objects, and features of the present invention will become apparent from the following detailed description of the exemplary embodiments, read in conjunction with, and reference to, the accompanying drawings.

DETAILED DESCRIPTION OF THE EXEMPLARY EMBODIMENTS

The invention can comprise a computer-readable program that can run on an engine executable on a computer that embodies the functions described herein and illustrated in the appended flow charts. In various embodiments, such a computer-readable program can be a program product and/or service that may be packaged and sold to users, or may be made available to users via an Internet interface. It should be apparent that there could be many different ways of implementing the invention in computer programming, and the invention should not be construed as limited to any one set of computer program instructions. Further, a skilled programmer would be able to write such a computer program to implement an embodiment of the disclosed invention based on the flow charts and associated description in the application text. Therefore, disclosure of a particular set of program code instructions is not considered necessary for an adequate understanding of how to make and use the invention. The inventive functionality of the claimed computer program will be explained in more detail in the following description read in conjunction with the figures illustrating the program flow.

Figure 1:
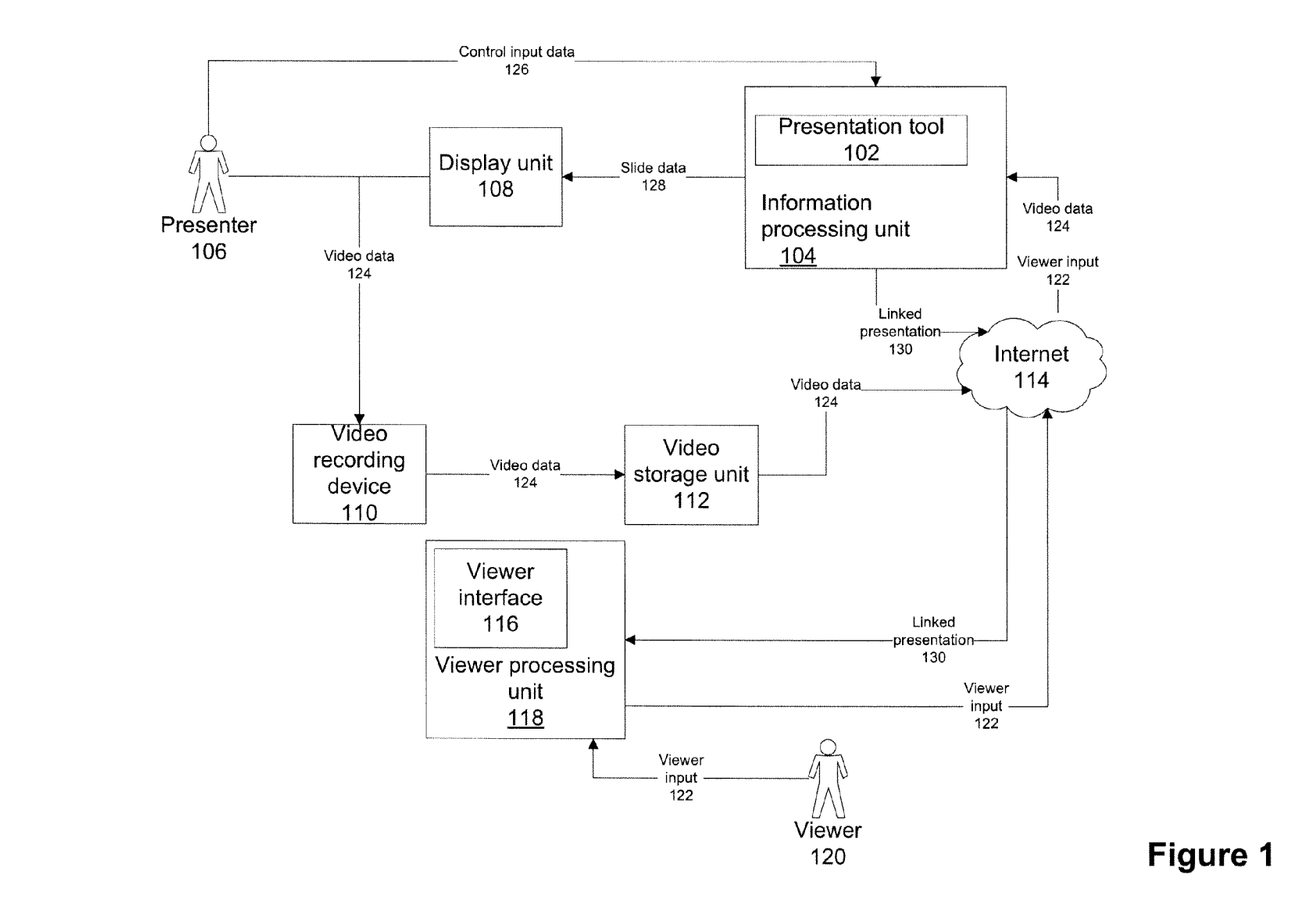
FIG. 1 is a block diagram depicting a system for providing linked video and slides from a presentation, according to an exemplary embodiment.
Figure 2:
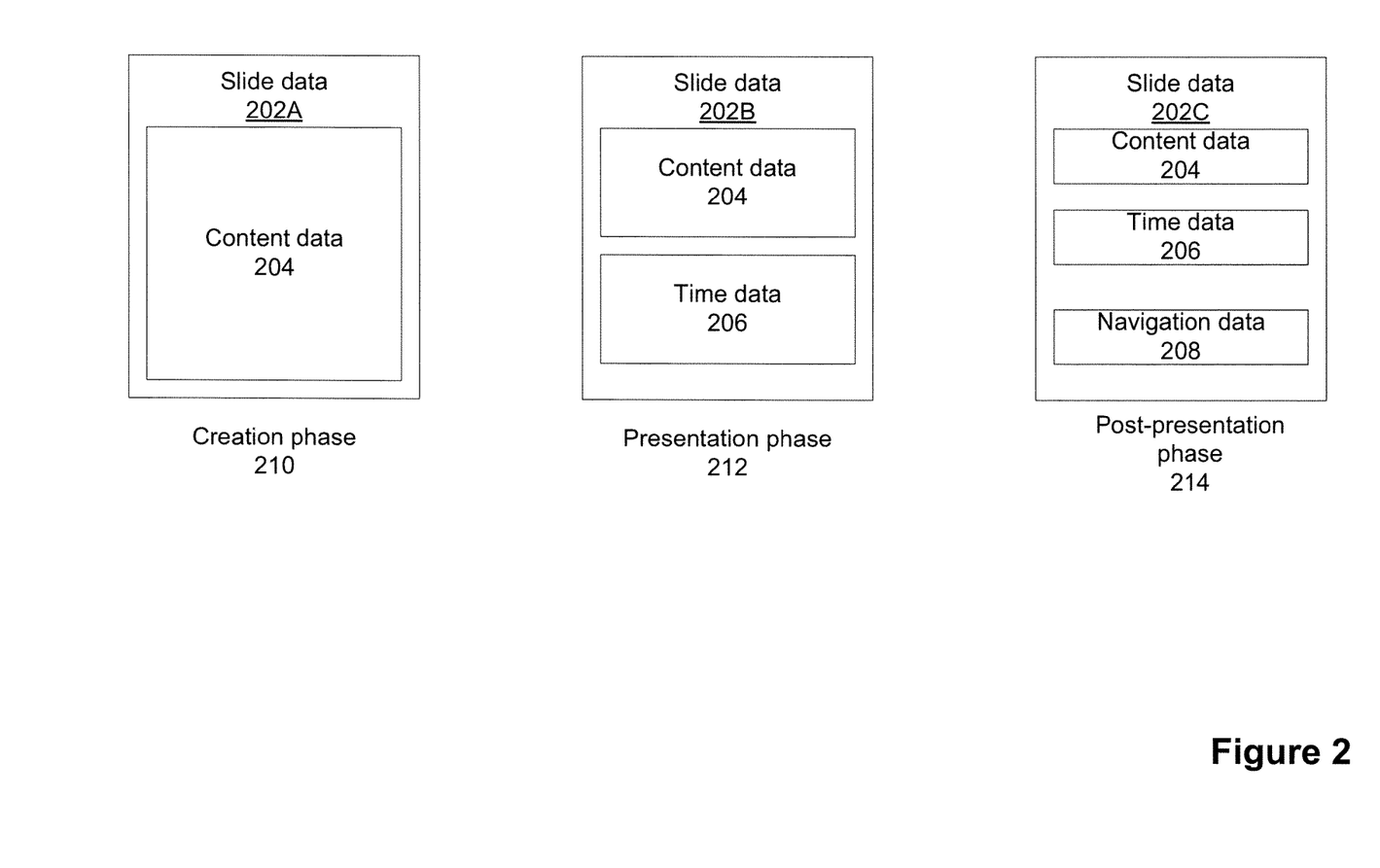
FIG. 2 is a block diagram depicting slide data associated with presentation slides, according to an exemplary embodiment.
Figure 3:
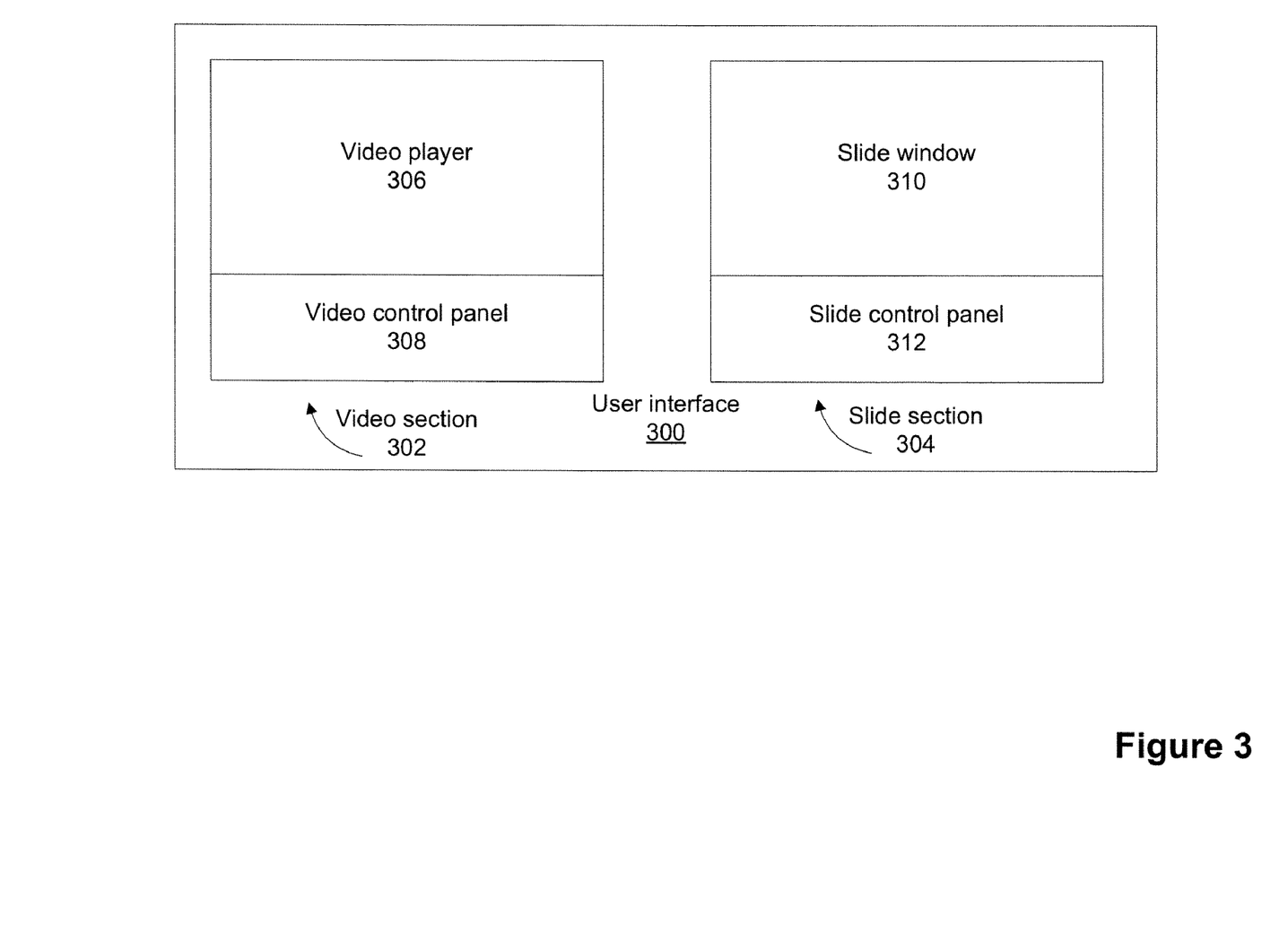
FIG. 3 is a block diagram depicting a user interface for viewing linked video and slides from a presentation, according to an exemplary embodiment.

A method and system for providing linked video and slides from a presentation to a viewer 120 will now be described with reference to FIGS. 1-7, which depict representative or illustrative embodiments of the invention. FIG. 1 is a block diagram depicting a system for providing linked video and slides from a presentation, according to an exemplary embodiment. FIG. 2 is a block diagram depicting slide data 128 associated with presentation slides, according to an exemplary embodiment. FIG. 3 is a block diagram depicting a user interface 116 for viewing linked video and slides from a presentation, according to an exemplary embodiment. Exemplary components of the system 100 will be described with reference to FIGS. 1-3.

The exemplary system includes a presentation tool 102 running on an information processing unit 104. The information processing unit 104 can be a server, or alternatively, can be a personal computer. A presenter 106 can use the presentation tool 102 to develop slides for a presentation, and then to present those slides during the presentation. The slides can be presented on a display unit 108 that is in communication with the presentation tool 102 that transmits slide data 128 to the display unit 108. In an exemplary embodiment, as shown in FIG. 2, when the presentation is being created (i.e., during a "creation phase" 210), slide data 128A can include content data 204 that indicates what will be shown on the display unit 108.

The presentation tool 102 can respond to control input data 126 from the presenter 106 to update the display unit 108 during the presentation. In one embodiment, the presentation tool 102 also can track the control input data 126 received from the presenter 106, and store time data 206 for each slide indicating when each slide was displayed. In another embodiment, as shown in FIG. 2, the time data 206 can be embedded into—or otherwise associated with—the slide data 128B itself in a presentation phase 212 (i.e., as the slides are being displayed). Because the time data 206 can be embedded into the slide data 128B or be otherwise associated with the slide data 128B, the time data 206 can exist either within the slide data 128B or separately from the slide data 128B, thereby enhancing the flexibility of the presentation tool 102. In a particular embodiment, even if the time data 206 is embedded into the slide data 128B, the time data 206 may not affect the content data 204, and thus, may not affect how the slide is displayed to a viewer 120. In another exemplary embodiment, all or a portion of the data associated with the slide can be metadata and/or stored in the form of light-weight codecs or plug-ins.

Audio and/or video of the presentation can be recorded by a video recording device 110. The video recording device 110 can record video data 124 corresponding to the presenter 106 and/or the display 108, and then can transmit the audio and/or video data 124 to a video storage unit 112, where the video data 124 can be made accessible to the presentation tool 102. The exemplary embodiments disclosed herein may describe the use of "video data" 124, but as will be recognized by one of ordinary skill in the art, audio data can be recorded, transmitted, and processed along with (or instead of) the video data

124. In an exemplary embodiment, the presentation tool 102 can access the video data 124 in the video storage unit 112 via a network such as the Internet 114. The presentation tool 102 then can link the video of the presentation with the slides from the presentation, using the time data 206 associated therewith.

In a particular embodiment, as shown in FIG. 2, navigation data 208 can be associated with the slide data 128C to link the video to the slides. Navigation data 208 can include an identification of the slide that should follow each slide (i.e., the next slide), the slide that precedes each slide (i.e., the previous slide), and a time-specific link (or other electronically accessible address) to the presentation video. The time-specific link to the presentation video can indicate both the address of the presentation video, and the time position of the video that corresponds with the slide. Navigation data 208 can be associated with the slide data 128C after the presenter 106 completes the presentation (i.e., in the post-presentation phase 214).

After the presentation tool 102 links the video data 124 and the slide data 128, the linked presentation 130 can be provided to viewers 120. In an exemplary embodiment, viewers 120 can access the linked presentation 130 over the Internet 114. In the embodiment illustrated in FIG. 1, the information processing unit 104 can act as a server and provide the linked presentation 130 to the viewer 120. In an alternative embodiment, a separate sever (not shown) can receive the linked presentation 130 from the presentation tool 102, such as via the Internet 114, and then provide the linked presentation 130 to the viewer 120. Regardless of how the viewer 120 receives access to the linked presentation 130, the viewer 120 can view the linked presentation 130 on a client processing unit 118, such as a personal computer. The computer can include a user interface 116 for viewing the presentation.

The user interface 116 can allow the viewer 120 to transmit viewer input 122 to control the presentation video and slides, such that the linked presentation 130 remains synchronized. In an exemplary embodiment, the user interface 116 can include a display unit 108 having two sections 302, 304 for the presentation video and the presentation slides, respectively. These sections 302, 304 can include a video player 306 and a slide window 310. Each section 302, 304 can include a control panel 308, 312 with buttons or other interfaces for the viewer 120 to control the presentation flow. For example, the viewer 120 can use the slide control panel 312 to advance or backtrack slides, or jump to a specific slide, and the video control panel 308 to advance or backtrack the video, or jump to a specific time point in the video. When the viewer 120 uses the slide control panel 312 to change slides, the video displayed also can proceed to the time point corresponding with the new slide. Similarly, when the viewer 120 uses to video control panel 308 to go to a specific time point, the user interface 116 can display the slide corresponding with the time point. The parties and structure depicted in FIGS. 1-3 will be discussed in more detail with reference to the methods illustrated in FIGS. 4-7.

Figure 4:
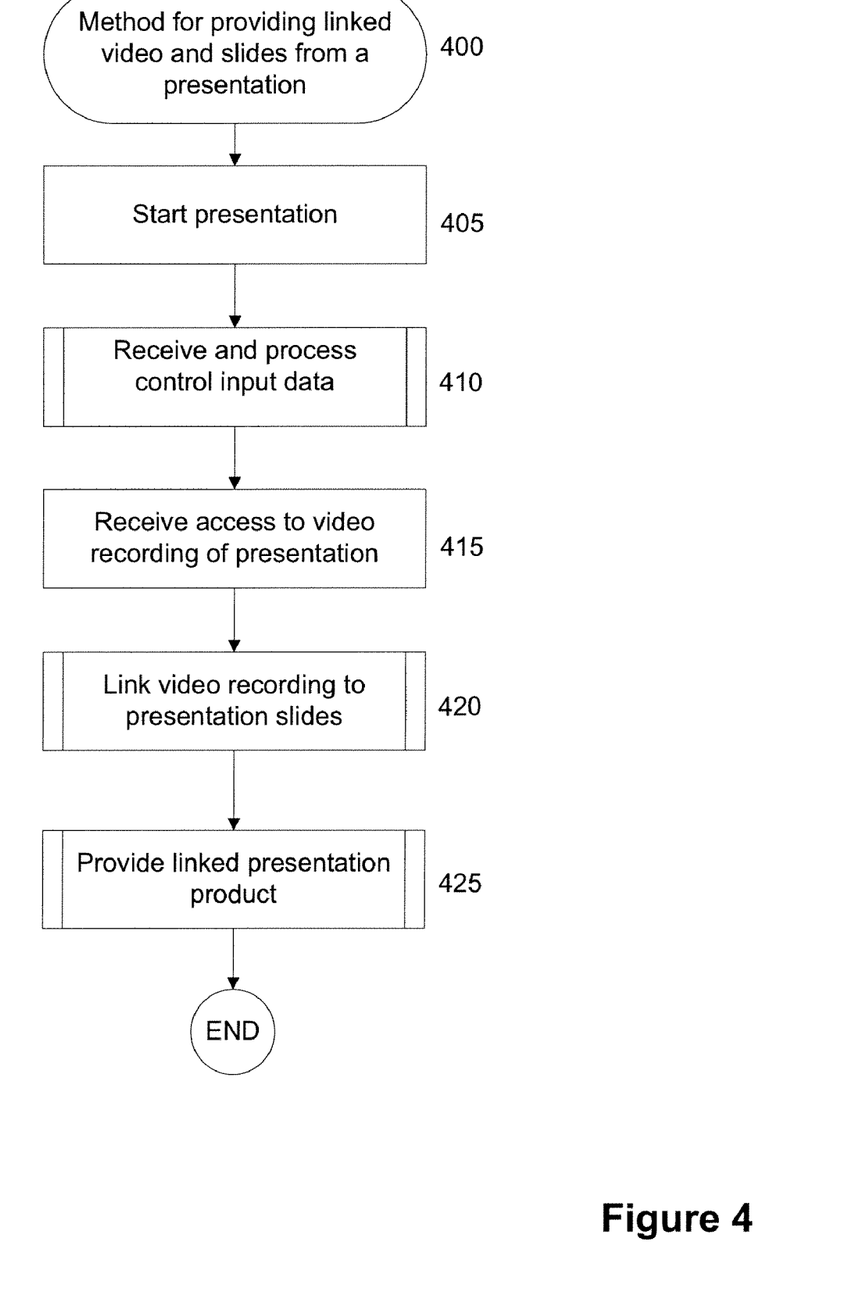
FIG. 4 is a flow chart depicting a method for providing linked video and slides from a presentation, according to an exemplary embodiment.

FIG. 4 is a flow chart depicting a method 400 for providing linked video and slides from a presentation, according to an exemplary embodiment. The method 400 will be described with reference to FIGS. 1-4.

In step 405, the presentation is started. In an exemplary embodiment, the presentation can be started when the presenter 106 starts the presentation tool 102 and loads the presentation slides, thereby seeking to display the first slide. Upon starting the presentation slides, the presentation tool 102 running on the information processing unit 104 can transmit slide data 128 associated with the first slide to the display unit 108. In an exemplary embodiment, the slide data 128 transmitted to the display unit 108 can include content data 204 that identifies the content of the presentation slide to the display unit 108. Content data 204 can include the color, layout, text, graphics, and any other aspects of how the slides should be displayed.

In one embodiment, the presenter 106 or another party may have used the presentation tool 102 to create the presentation slides. In an alternative embodiment, the presentation slides may have been created using another computer software program or other development tool.

The display unit 108 used to show the slides to a live audience can be any device capable of receiving slide data 128 from the presentation tool 102 and displaying a visual representation of the slide associated with the slide data 128. Examples of display units 108 can include a monitor or a television. Alternatively, the display unit 108 can include a projector in communication with the presentation tool 102 and a screen onto which the projector can project an image. The display unit 108 also can include speakers or another component for presenting audio data associated with a slide to the audience.

In one embodiment, when the presentation is started, a video of the presentation can begin recording. The recording can be accomplished with the use of a video recording device 110, such as a digital video recorder. In an exemplary embodiment, the video recording device 110 can have a digital storage device, such as a hard drive or flash drive, for storing video recordings. The video recording device 110 also can have a communications port for transmitting the video recording to a computer or other device. The video recording device 110 also can record audio, so as to record anything the presenter 106 may discuss during the presentation. The video data 124 transmitted by the video recording device 110 can be in a variety of formats (e.g., MPEG, AVI) as will be recognized by one of ordinary skill in the art having the benefit of the present disclosure.

In a particular exemplary embodiment, time data 206 associated with the video and slides of the presentation can be measured relative to the start of the video recording. For example, in one embodiment, an operator of the video recording device 110 can indicate to the presenter 106 when the video recording has begun. The presenter 106 (or a third party) then can begin displaying the presentation slides, or otherwise indicate to the presentation tool 102 that the presentation has begun. The "clock" for measuring the time relative to the start of the presentation can begin at that point in time.

In step 410, the presenter's 106 control input data 126 is received and processed. In an exemplary embodiment, control input data 126 can include any indication from the presenter 106 to change what is shown on the display unit 108. Examples of control input data 126 include an indication from the presenter 106 to proceed to the next slide, to go back to the previous slide, and to display a specific slide. Other examples include starting and ending the presentation.

In various exemplary embodiments, the presenter 106 can transmit control input data 126 to the presentation tool 102 in a variety of ways. In one embodiment, the presenter 106 can use a wired or wireless computer input device, such as a keyboard or mouse. Alternatively, the presenter 106 can use a wireless remote to control the flow of the presentation. In another embodiment, the presenter 106 can pre-enter the control input data 126 by programming into the presentation set times for the slide to advance.

In one embodiment, processing the control input data 126 can include using the presentation tool 102 to transmit slide data 128 to the display unit 108 to show the proper slide to the audience. Processing the control input data 126 also can include storing time data 206 indicating the time at which each slide was displayed, and for how long each slide was displayed. Step 410 will be described in more detail with reference to FIG. 5.

In step 415, access to a video recording of the presentation is received. As described previously with respect to step 405, an audio and video recording can be made of the presentation as it is presented. In an exemplary embodiment, audio and video data 124 can be transmitted by the video recording device 110 to the presentation tool 102, either directly or indirectly (i.e., through an intermediate device or interface such as a computer). In an alternative embodiment, the audio and video data 124 can be uploaded to a server to enable access via a network such as the Internet 114. In such an embodiment, access to the recording can be provided by providing a link to the recording to the presentation tool 102. The presentation tool 102 then can access and/or receive the audio and video data 124 associated with the video recording by accessing the link.

In step 420, the video recording is linked to the presentation slides. In an exemplary embodiment, linking the video recording to the presentation slides can include receiving a link to the video recording, using time data 206 for each slide to determine which segments of the video recording correspond with each slide, and then associating each slide with the corresponding segments of the video recording. Step 420 will be described in more detail with reference to FIG. 6.

In step 425, a linked presentation 130 product is provided. In an exemplary embodiment, the linked presentation 130 product can be an online, synchronized data product that includes presentation slides and presentation video associated with the slides that can be viewed by a viewer 120 simultaneously. In another exemplary embodiment, the linked presentation 130 product can remain synchronized while being controlled by a viewer 120. A viewer 120 can use a user interface 116 to view the presentation slides and presentation video simultaneously, and to advance or backtrack the slides. When the viewer 120 advances or backtracks the slides, the user interface 116 can communicate with the presentation tool 102 to display the presentation video that is associated with the displayed slide. Conversely, if the viewer 120 advances or rewinds the presentation video, the user interface 116 can communicate with the presentation tool 102 to display the presentation slide that is associated with the displayed video segment. Step 425 will be described in more detail with reference to FIG. 7. After step 425, the method 400 ends.

Figure 5:
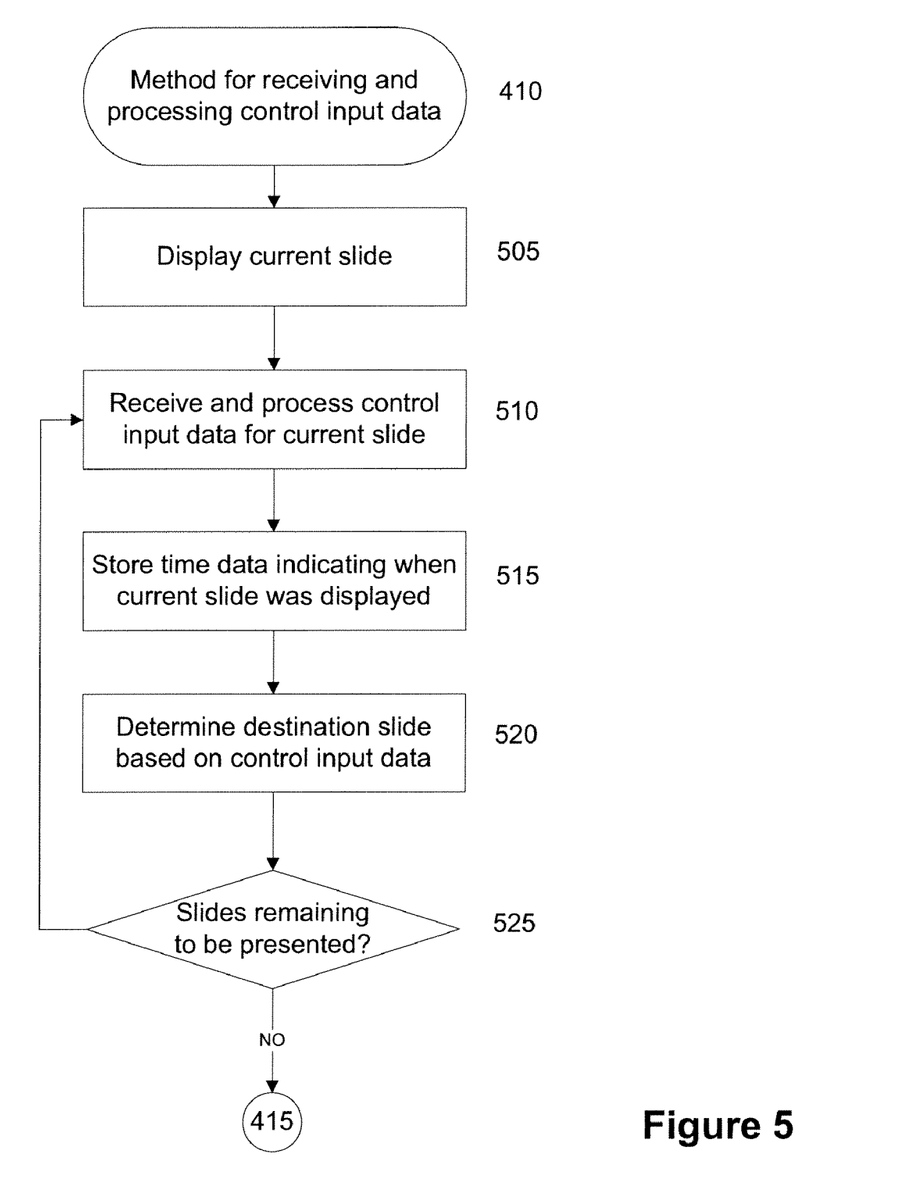
FIG. 5 is a flow chart depicting a method for receiving and processing a presenter's control input data, according to an exemplary embodiment.

FIG. 5 is a flow chart depicting a method 410 for receiving and processing a presenter's 106 control input data 126, according to an exemplary embodiment. The method 410 will be described with reference to FIGS. 1-3 and 5.

In step 505, a current slide is displayed. In an exemplary embodiment, the current slide can refer to the slide that the presenter 106 desires to display to the audience, which may be the slide that the presenter 106 is discussing at a given time. Initially, the current slide is typically the first slide in the presentation. Displaying the current slide to the audience can include transmitting slide data 128 from the presentation tool 102 to the display unit 108, as described previously. In another embodiment, the current slide also can be transmitted to an additional display unit 108, such as a display unit 108 only viewable by the presenter 106.

In step 510, the presenter's 106 control input data 126 is received and processed for the current slide. In an exemplary embodiment, receiving the presenter's 106 control input data 126 can include receiving an indication from the presenter 106 that the presentation should advance to the next slide. In alternative embodiments, control input data 126 can include receiving indications that the presentation should return to the previous slide, or display any particular slide. In another alternative embodiment, control input data 126 can include receiving an indication that the presenter 106 desires to alter the appearance of the current slide, such as by displaying an animation or video embedded in the current slide. In such an embodiment, the activation of such an embedded component can be treated as advancement to a new slide by the presentation tool 102.

In step 515, time data 206 indicating when the current slide was displayed is stored. In one embodiment, time data 206 for the current slide can indicate the time at which the presenter 106 sought to display the current slide, which can be determined based on the time control input data 126 is received by the presentation tool 102. In a particular embodiment, this time can be relative to the start time of the presentation (i.e., the time elapsed since the start of the presentation). Time data 206 also can include the amount of time the current slide was displayed (i.e., the time elapsed since the display unit 108 showed the current slide). In an alternative embodiment, instead of storing the amount of time the current slide is displayed, the presentation tool 102 can store the time at which the presenter 106 sought to change slides from the current slide. The presentation tool 102 can use this time data 206 to calculate the amount of time the current slide was displayed.

In an exemplary embodiment, the time data 206 for the current slide can be stored by the presentation tool 102. In a particular embodiment, the presentation tool 102 can store the time data 206 for the current slide by associating the time data 206 with the current slide, as shown in the presentation phase 212 of FIG. 2. The time data 206 associated with the slide data 128B of the current slide may not affect the content data 204 of the slide, and thus, may not affect how that slide is displayed during the presentation.

In an exemplary embodiment, some slides may have been shown during the presentation more than once. For example, if during the presentation the presenter 106 wishes to backtrack to refer to an earlier point, the presenter 106 may return to an earlier slide. In such cases, more than one set of time data 206 can be associated with such a slide, so as to indicate each time the slide was displayed during the presentation. In an alternative embodiment, if the presenter 106 returns to a previous slide, the previous slide can be treated as a new slide by the presentation tool 102, and thus have only one set of time data 206 associated with the slide.

In step 520, the destination slide is determined based on the presenter's 106 control input data 126 received in step 510. In an exemplary embodiment, the destination slide can be the slide that the presenter 106 seeks to display after the current slide. The destination slide can be determined based on the presenter's 106 control input data 126. For example, if the presenter 106 indicated to move the presentation from the current slide to the next slide, then the destination slide can be the slide following the current slide in the presentation. Alternatively, if the presenter 106 indicated to move the presentation from the current slide to the previous slide, then the slide preceding the current slide can be the destination slide.

Once the presentation tool 102 determines the identity of the destination slide, the presentation tool 102 can transmit the slide data 128 and content data 204 associated with the destination slide to the display unit 108, so that the destination slide is displayed to the audience. Additionally, the time at which the presentation tool 102 receives an indication of the destination slide can be used to calculate or determine the time data 206 for the current slide. For example, the time at which an indication is received to display the destination slide can be used to calculate the duration of time for which the current slide was displayed.

In step 525, the method 410 determines whether slides are remaining to be presented. In one embodiment, determining whether slides are remaining to be presented can include determining whether additional slides in the presentation exist after the destination slide. In an alternative embodiment, the determination can include determining whether the presentation tool 102 has received control input data 126 from the presenter 106 indicating that the end of the presentation has been reached, such as by the presenter 106 indicating a desire to stop the presentation. If at least one slide is remaining, the method 410 returns to step 510, where the destination slide becomes the current slide. Otherwise, method 410 proceeds to step 415, as referenced in FIG. 4.

Figure 6:
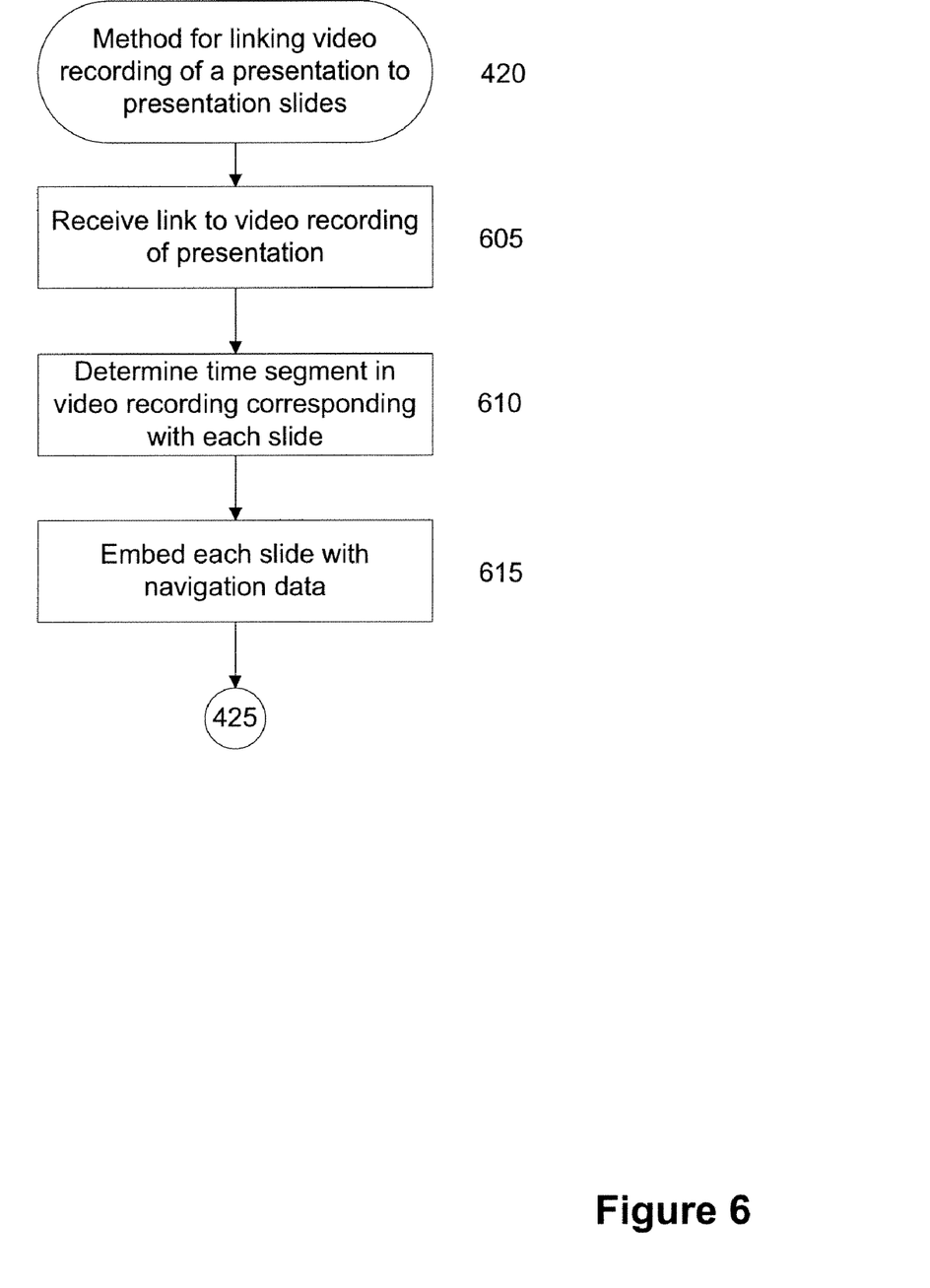
FIG. 6 is a flow chart depicting a method for linking a video recording of a presentation to the presentation slides, according to an exemplary embodiment.

FIG. 6 is a flow chart depicting a method 420 for linking a video recording of a presentation to the presentation slides, according to an exemplary embodiment. The method 420 will be described with reference to FIGS. 1-3 and 6.

In step 605, a link to a video recording of the presentation is received. In an exemplary embodiment, receiving a link to the video recording can be accomplished by the presenter 106 or other party uploading the video recording of the presentation to a server accessible via a network such as the Internet 114, and then inputting the link to the video into the presentation tool 102. The presentation tool 102 can include an option for inputting the link to a video to be associated with a given set of presentation slides that had been presented using the presentation tool 102.

In an alternative embodiment, instead of providing a link to the video recording of the presentation, the presenter 106 or other party can provide the actual video recording to the presentation tool 102. For example, the presenter 106 may transmit audio and video data 124 corresponding with the video recording to the information processing unit 104 running the presentation tool 102 software.

In step 610, the time segment in the video corresponding with each slide is determined. Determining a time segment corresponding with each slide can include analyzing the time data 206 associated with each slide during step 515. In an exemplary embodiment, determining the time segment in corresponding with each slide can include analyzing the time data 206 associated with each slide to determine the point in time in the video at which the slide was displayed during the presentation. For example, if the presenter 106 spent 30 seconds on each of the first five slides from a presentation, the time segment in the video corresponding with the fifth slide can be from two minutes into the presentation until two minutes and 30 seconds into the presentation.

As discussed previously with reference to step 515 of FIG. 5, in an exemplary embodiment, some slides may have been showing during the presentation more than once. For these slides, multiple time segments in the video may be determined as corresponding with the slide.

In step 615, each slide is associated with navigation data 208. In an exemplary embodiment, navigation data 208 for each slide can include: (1) each slide's next slide, (2) each slide's previous slide, and (3) the time segments of the video recording corresponding with each slide, as determined in step 610. In another embodiment, the navigation data 208 can include a time-specific link to the video recording, indicating the particular time point in the video recording that corresponds to the time at which the slide was displayed during the presentation.

In one embodiment, each slide's next and previous slide can be determined based on the time data 206 recorded in step 515, as referenced in FIG. 5. By analyzing the time data 206 of each slide, the presentation tool 102 can determine the order in which each slide was displayed, and thus determine the slide that followed and preceded each slide.

In another embodiment, the time-specific link to the video recording can be determined based on the time segments of the video corresponding with each slide, as determined in step 610 and/or the time data 206 recorded in step 515, as reference in FIG. 5. For example, a time-specific link for a given slide can be created by combining the link to the recorded video with the time at which the presentation tool 102 received control input data 126 from the presenter 106 indicating a desire to display the slide to the audience. Thus, if the time data 206 indicates that a given slide was initially displayed three minutes into the presentation, the time-specific link can point to the three minute mark of the recorded video.

In another exemplary embodiment, the slide data 128 can be associated with the navigation data 208. As shown in FIG. 2, after the presentation has been completed (i.e., in the post-presentation phase 214), the slide data 128C can include the content data 204 that was created when the presentation was developed, time data 206 that was created by the presentation tool 102 during the presentation, and the navigation data 208 that was created by the presentation tool 102 after the presentation concluded. The navigation data 208 can be used by the presentation tool 102 when the linked presentation 130 product is being viewed and controlled by a viewer 120.

After step 615, the method 420 proceeds to step 425, as referenced in FIG. 4.

Figure 7:
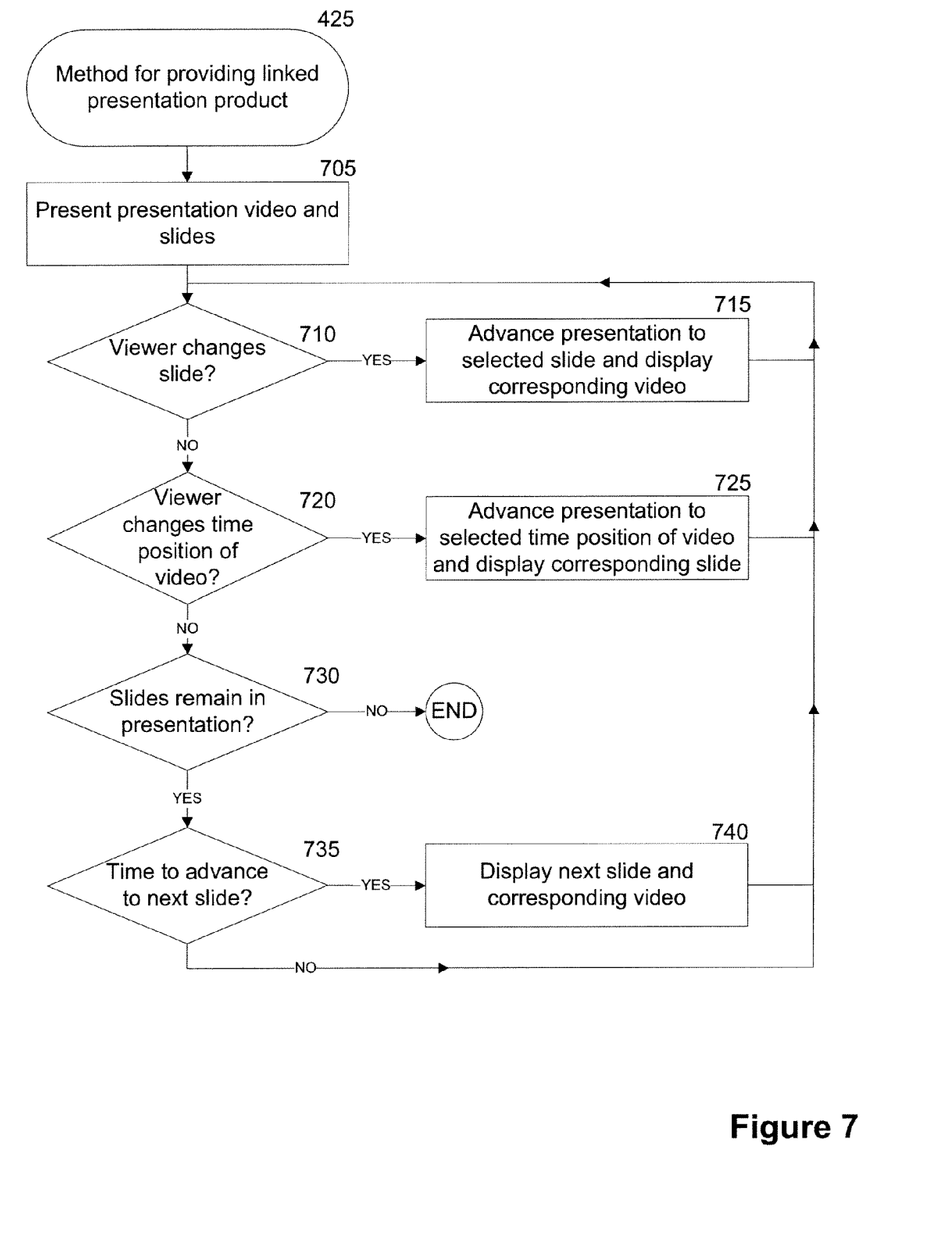
FIG. 7 is a flow chart depicting a method for providing a linked presentation product, according to an exemplary embodiment.

FIG. 7 is a flow chart depicting a method 425 for providing a linked presentation 130 product, according to an exemplary embodiment. The method 425 will be described with reference to FIGS. 1-3 and 7.

In step 705, the presentation video and slides are presented. In an exemplary embodiment, a viewer 120 can use a client processing unit 118 having a user interface 116 for receiving the linked presentation 130 video. In one embodiment, as shown in FIG. 1, the user interface 116 can be provided to the viewer's 120 client processing unit 118 by the presentation tool 102, via a network such as the Internet 114. In an alternative embodiment, the user interface 116 can be provided to the viewer's 120 client processing unit 118 by another entity that may have access to the linked presentation 130 generated by the presentation tool 102.

As shown in the exemplary user interface 116 depicted in FIG. 3, the user interface 116 can include a presentation slide interface and a presentation video interface. The presentation video interface can include a video player 306 for displaying the presentation video, as well as a video control panel 308 for controlling the video. The presentation slide interface also can be in communication with an audio output device, such as speakers for the client processing unit 118, which can output audio associated with the presentation slides.

The video control panel 308 can, for example, include interfaces for receiving viewer input 122 to rewind and fast-forward the video, as well as a navigation bar for positioning the video at a given time point. The presentation video interface also can be in communication with an audio output device, such as speakers for the client processing unit 118, which can output audio associated with the video recording of the presentation.

In another embodiment, the presentation slide interface of the user interface 116 can include a slide window 310 for displaying a given presentation slide, as well as a slide control panel 312 for controlling the slides displayed in the slide window 310. The slide control panel 312 can include interfaces to display the next and previous slides in the presentation, as well as an interface for entering and/or selecting a specific slide to display in the slide window 310.

In another embodiment, the next slide and previous slide interfaces can be used to register viewer input 122 and allow the viewer 120 to access the slides that either followed or preceded a given slide during the presentation of the slide, instead of the slides that followed or preceded a given slide in the presenter's 106 creation of the presentation slides. For example, if during a presentation, the first four slides were displayed in order, but then after the fourth slide was displayed, the presenter 106 returned the presentation to the second slide to make a follow-up point, the "next slide" to the fourth slide can be considered to be the second slide, and not the fifth slide. If the presenter 106 then proceeded to the fifth slide, then the second slide could be considered to have two "next slides"—i.e., the third slide and the fifth slide. In such cases, when selecting to advance to the "next slide" from such a slide, the viewer 120 may be presented with an option of advancing to the third slide or the fifth slide. In an alternative embodiment, such as where the display portions of the user interface 116 may be relatively small (such as on a mobile Internet device) and therefore entering input may be cumbersome, the viewer 120 may be presented with the next slide that appears first (in this example, the third slide), instead of being presented with an option.

In step 710, the method 425 determines whether the viewer 120 seeks to change slides. In exemplary embodiments, the viewer 120 can indicate a desire to change slides by using the slide control panel 312. The slide the viewer 120 may seek to view can be the slide following or preceding the currently displayed slide, or a specific slide in the presentation. If the viewer 120 seeks to change slides, the method 425 branches to step 715. Otherwise, the method 425 proceeds to step 720.

In step 715, the user interface 116 advances to the slide selected by the viewer 120 and displays the video corresponding with that slide. In one embodiment, the slide window 310 of the user interface 116 can display the slide that the viewer 120 selected in step 710. In another embodiment, if the viewer 120 had used either the next slide or previous slide interfaces in step 710, the slide window 310 can display the selected slide by using the next slide or previous slide data 128 included as part of the navigation data 208 in step 615 of FIG. 6.

In another embodiment, the video player 306 can display the video corresponding with the slide selected by the viewer 120 in step 710. In an exemplary embodiment, the video corresponding with the selected slide can be displayed by accessing the time-specific video link included as part of the navigation data 208 in step 615 of FIG. 6.

As described previously, one or more of the slides may have been displayed more than one time. Thus, there may be multiple video segments that correspond to such slides, and there may be multiple time-specific video links included in the navigation data 208. In one embodiment, for such cases, the viewer 120 can be prompted to select which video segment the viewer 120 desires to receive when viewing the slide. In other embodiments, the video player 306 can automatically proceed to a point in the video where the slide was first discussed. After step 715, the method 425 returns to step 710.

In step 720, the method 425 determines whether the viewer 120 seeks to change the time position of the video. In exemplary embodiments, the viewer 120 can indicate a desire to change the time position of the video by using the video control panel 308. The viewer 120 can select the desired time position of the video to view by rewinding or fast-forwarding the video, or by using the navigation bar to select a particular time position in the video to view. If the viewer 120 seeks to change the time position of the video, the method 425 branches to step 725. Otherwise, the method 425 proceeds to step 730.

In step 725, the presentation video advances to the time period selected by the viewer 120, and displays the slide corresponding with that time period. In one embodiment, the video player 306 of the user interface 116 can display the video at the time period that the viewer 120 selected in step 720.

In another embodiment, the slide window 310 can display the slide corresponding with the particular time in the video selected by the viewer 120 in step 720. In an exemplary embodiment, the slide corresponding with the time in the video selected by the viewer 120 can be determined based on the time data 206 and navigation data 208 associated with the slides. For example, the user interface 116 can review the time data 206 of each slide to determine which slide was displayed at a given point in time. This slide then can be displayed to the viewer 120 in the slide window 310. After step 725, the method 425 returns to step 710.

In step 730, the method 425 determines whether slides remain in the presentation. In an exemplary embodiment, slides may not remain in the presentation if the next slide field associated with a given slide is blank, or otherwise indicates that the given slide was the final slide in the presentation. If slides remain in the presentation, the method 425 branches to step 735. Otherwise, the method 425 ends.

In step 735, the method 425 determines whether it is time to advance to the next slide. In a particular embodiment, it can be considered time to advance to the next slide when the given slide has been displayed for the amount of time indicated by the time data 206 for the slide. For example, if the fourth slide was shown by the presenter 106 during the presentation for 30 seconds before advancing to the fifth slide, then when the viewer 120 is viewing the linked presentation 130 at the fourth slide, the user interface 116 can determine whether the fourth slide has been displayed for 30 seconds. If it is time to advance to the next slide, the method 425 branches to step 740. Otherwise, the method 425 returns to step 710.

In step 740, the next slide and corresponding video are displayed. In an exemplary embodiment, this step 740 is reached when the viewer 120 did not use either the slide control panel 312 or video control panel 308 to advance or rewind the presentation, and instead viewed a given presentation slide and corresponding video in their entirety. In such an embodiment, the user interface 116 can display the next slide by using the given slide's next slide data, which indicates the slide to follow each given slide. Additionally, the corresponding video can be displayed without specific action by the user interface 116, as the video can automatically proceed in chronological order. After step 740, the method 425 returns to step 710.

The exemplary methods and steps described in the embodiments presented previously are illustrative, and, in alternative embodiments, certain steps can be performed in a different order, in parallel with one another, omitted entirely, and/or combined between different exemplary methods, and/or certain additional steps can be performed, without departing from the scope and spirit of the invention. Accordingly, such alternative embodiments are included in the invention described herein. For example, in the illustrated embodiments, systems and methods according to the present invention involve linking of video and presentation having a temporal relationship to permit linking or otherwise navigating from one medium at a first point in the duration of the medium to the other medium at the same point in the duration of the medium. Systems and methods according to the present invention more generally encompass linking of a first time-varying network-deliverable medium with a second time-varying network deliverable medium, including embodiments in which the first medium is a continuous medium, without limitation video, and the second medium is a discrete medium, without limitation slide-form presentation. Other examples of continuous media include but are not limited to audio, while other examples of discrete media may include without limitation photographs and/or documents.

Another exemplary alternative embodiment can include synchronizing more than two data streams to form a synchronized product. Though the illustrated embodiments disclose the linking of two data streams or media, the invention more generally encompasses linking of multiple data streams or media together to form a synchronized product. Thus, as will be recognized by one of ordinary skill in the art having the benefit of the present disclosure, data corresponding with multiple data streams such as related audio, video, slide presentations, and photographs all can be received, time-indexed, linked to each other, and then combined into a synchronized online product.

The invention can be used with computer hardware and software that performs the methods and processing functions described above. As will be appreciated by those skilled in the art, the systems, methods, and procedures described herein can be embodied in a programmable computer, computer executable software, or digital circuitry. The software can be stored on computer readable media. For example, computer readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

Although specific embodiments of the invention have been described above in detail, the description is merely for purposes of illustration. Various modifications of, and equivalent steps corresponding to, the disclosed aspects of the exemplary embodiments, in addition to those described above, can be made by those skilled in the art without departing from the spirit and scope of the invention defined in the following claims, the scope of which is to be accorded the broadest interpretation so as to encompass such modifications and equivalent structures.

What is claimed is:

1. A method for creating a synchronized presentation for publication as an online product, the method comprising the steps of:

receiving continuous data, the continuous data captured in an identified time frame;

receiving slide-presentation data in the identified time frame, the slide-presentation data being associated with the continuous data;

generating, by a computer, a synchronized presentation online product, including generating a plurality of time-indexed links in at least one of the continuous data or the slide-presentation data, each link comprising at least one time duration during which at least a portion of the continuous data and at least a portion of the slide-presentation data are associated for presentation; and storing the synchronized presentation online product in a data storage device for later retrieval and online delivery, wherein the synchronized presentation online product is permitted to be accessed by viewers for online publication, viewers that receive the synchronized presentation online product are permitted to identify a selection of the continuous data at a particular point in time and select one of a plurality of selections of the slide-presentation data associated with the particular time point based on the plurality of time-indexed links, viewers that receive the synchronized presentation online product are permitted to identify a selection of the slide-presentation data at a particular point in time and select one of a plurality of selections of the continuous data associated with the particular time point based on the plurality of time-indexed links, and the synchronized presentation online product is displayed on a user interface in a time-coordinated fashion.

2. The method of claim 1, wherein the continuous data comprises video data.

3. The method of claim 1, wherein the continuous data comprises audio data, and the slide-presentation data contains data representing at least one of photographs and documents.

4. The method of claim 1, wherein the synchronized presentation online product is provided to viewers via an Internet interface.

5. A method for creating an online product comprising synchronized data streams, the method comprising the steps of:

receiving a first data stream comprising video data, the video data captured in an identified time frame;

receiving a second data stream comprising slide-presentation data in the identified time frame, the received slide-presentation data being associated with the video data;

generating, by a computer, a synchronized online product comprising the video data and the slide presentation data, including generating a plurality of time-indexed links in at least one of the video data or the slide-presentation data, each link comprising at least one time duration during which at least a portion of the video data and at least a portion of the slide-presentation data are associated for presentation; and storing the synchronized online product in a data storage device for later retrieval and online delivery, wherein the synchronized online product is permitted to be accessed by viewers for online publication, viewers that receive the synchronized online product are permitted to identify a selection of the video data at a particular point in time and select one of a plurality of selections of the slide-presentation data associated with the particular point in time based on the plurality of time-indexed links, viewers that receive the synchronized online product are permitted to identify a selection of the slide-presentation data at a particular point in time and select one of a plurality of selections the video data associated with the particular point in time based on the plurality of time-indexed links, and the synchronized online product is displayed on a user interface in a time-coordinated fashion.

6. The method of claim 1, further comprising the steps of:

receiving at least one additional data stream comprising additional data captured in the identified time frame, the additional data associated with the slide presentation data and the video data, wherein the synchronized online product further comprises the additional data.

7. The method of claim 1, wherein
   each link comprises a plurality of time duration during which portions of the video data and the slide-presentation data are associated for presentation, and
   the step of generating the plurality of time-indexed links further comprises calculating time duration data for each of the portions.

8. The method of claim 1, wherein a presenter of the slide-presentation data is present during a capture of the video data in the identified time frame.

9. The method of claim 1, wherein
   a presenter of the slide-presentation data is present during a capture of the video data in the identified time frame,
   the presenter delivers the slide-presentation data received in the identified time frame during a capture of the video data, and
   time data is recorded when the presenter advances the presentation.

10. The method of claim 1, wherein the step of receiving video data comprises receiving an electronic address of the video data.

11. The method of claim 1, wherein the synchronized online product is provided to viewers via an Internet interface.

12. A system for creating synchronized video and an accompanying slide-presentation for online publication, the system comprising:
   one or more information processing units for executing programs;
   one or more network interfaces in communication with the one or more information processing units for receiving and transmitting video and presentation data;
   one or more data storage devices in communication with the one or more information processing units;
   an engine executable on the one or more information processing units, the engine comprising
      instructions for receiving video data, the video data captured in an identified time frame,
      instructions for receiving data representing a presentation in the identified time frame, the received presentation data being associated with the video data,
      instructions for generating a synchronized combined video and presentation online product, including generating a plurality of time-indexed links in at least one of the video data or the presentation data, each link comprising at least one time duration during which at least a portion of the video data and at least a portion of the presentation data are associated for presentation,
      instructions for storing the online product in a data storage device for later retrieval and online delivery of the online product,
      instructions for retrieving the online product,
      instructions for transmitting the online product to a viewer upon request,
      instructions for identifying a selection of the video data at a particular point in time and selecting one of a plurality of selections of the presentation data associated with the particular point in time based on the plurality of time indexed links, and
      instructions for identifying a selection of the presentation data at a particular point in time and selecting one of a plurality of selections of the video data associated with the particular point in time based on the plurality of time indexed links.

13. The system of claim 12, wherein generating the plurality of time-indexed links further comprises calculating time duration data.

14. The system of claim 12, wherein a presenter of the presentation data is present during a capture of the video data in the identified time frame.

15. The system of claim 12, wherein
   a presenter of the presentation data is present during a capture of the video data in the identified time frame,
   the presenter delivers the presentation data received in the identified time frame during video data capture, and
   time data is recorded when the presenter advances the presentation.

16. The system of claim 12, wherein the instructions for receiving video data further comprise instructions for receiving an electronic address of the video data.

17. The system of claim 12, wherein the online product is transmitted to the viewer via an Internet interface.

18. A non-transitory computer-readable storage medium storing computer readable instructions thereon that, when executed by a computer, direct the computer to perform a process for use in conjunction with a system containing a presentation tool application and a video player application, comprising:
   extending the presentation tool application to create and store time-indexed hyperlink information;
   transmitting video data captured in an identified time frame;
   transmitting presentation data associated with the video data in the identified time frame;
   generating, by the computer, a synchronized online product comprising the video data and the presentation data, including generating a plurality of time-indexed hyperlinks in at least one of the video data or the presentation data, each link comprising at least one time duration during which at least a portion of the video data and at least a portion of the presentation data are associated for presentation; and
   extending the video player application that consumes time-indexed hyperlinks, wherein
   viewers that receive the synchronized online product are permitted to identify a selection of the video data at a particular point in time and select one of a plurality of selections of the presentation data associated with the particular point in time based on the plurality of time-indexed links, and
   viewers that receive the synchronized online product are permitted to identify a selection of the presentation data at a particular point in time and select one of a plurality of selections the video data associated with the particular point in time based on the plurality of time-indexed links.

19. The non-transitory computer-readable storage medium of claim 18, wherein each time-indexed hyperlink is associated with video data at a given time position.

20. The non-transitory computer-readable storage medium of claim 18, wherein the presentation data comprises a plurality of presentation slides.

21. The non-transitory computer-readable storage medium of claim 18, wherein
   the presentation data comprises a plurality of presentation slides, and
   the generating a synchronized online product further comprises generating time-indexed metadata associated with the presentation slides.

22. The non-transitory computer-readable storage medium of claim 18, wherein the video player comprises a user interface having a video control panel for controlling output of the video player.

23. The non-transitory computer-readable storage medium of claim 18, wherein the process is operated by a user via an Internet interface.

24. A non-transitory computer-readable medium storing computer readable instructions thereon that, when executed by a computer, direct the computer to perform a process for use in conjunction with running a video player application and a presentation application, comprising:

receiving a synchronized combined video and presentation online product, the synchronized combined video and presentation online product comprising first computer-readable data representing video content containing a plurality of time-stamped hyperlinks and second computer-readable data representing presentation content containing a plurality of time-stamped hyperlinks, the time stamped hyperlinks comprising at least one time duration during which at least a portion of the video content and at least a portion of the presentation content are associated for presentation;

identifying, by the computer, a portion of the video content at a particular point in time and prompting, by the computer, a selection of one of a plurality of portions of the presentation content associated with the particular point in time based on the plurality of time-stamped hyperlinks;

identifying, by the computer, a portion of the presentation content at a particular point in time and prompting, by the computer, a selection of one of a plurality of portions of the video content associated with the particular point in time based on the plurality of time-stamped hyperlinks; and displaying, in connection with the video player application and the presentation application, the synchronized combined video and presentation online product.

25. The non-transitory computer-readable storage medium of claim 24, wherein the first computer-readable data further represents audio content associated with the video content.

26. The non-transitory computer-readable storage medium of claim 24, wherein the presentation application comprises a user interface having a slide control panel for controlling output of the presentation application.

27. The non-transitory computer-readable storage medium of claim 24, wherein the video player application comprises a user interface having a video control panel for controlling output of the video player application.

28. The non-transitory computer-readable storage medium of claim 24, wherein the process is operated by a user via an Internet interface.

\* \* \* \* \*

UNITED STATES PATENT AND TRADEMARK OFFICE
CERTIFICATE OF CORRECTION

PATENT NO.        : 8,151,179 B1
APPLICATION NO.   : 12/126136
DATED             : April 3, 2012
INVENTOR(S)       : Raman et al.

It is certified that error appears in the above-identified patent and that said Letters Patent is hereby corrected as shown below:

IN THE CLAIMS:

Column 14, claim 6, line 61, change "claim 1" to -- claim 5 --.

Column 15, claim 7, line 1, change "claim 1" to -- claim 5 --.

Column 15, claim 8, line 8, change "claim 1" to -- claim 5 --.

Column 15, claim 9, line 11, change "claim 1" to -- claim 5 --.

Column 15, claim 10, line 19, change "claim 1" to -- claim 5 --.

Column 15, claim 11, line 22, change "claim 1" to -- claim 5 --.

Signed and Sealed this
Thirtieth Day of September, 2014

Michelle K. Lee
*Deputy Director of the United States Patent and Trademark Office*